United States Patent

Schmidt

[15] 3,678,327

[45] July 18, 1972

[54] HEAT TRAP FOR AN AIR-COOLED VHF POWER KLYSTRON

[72] Inventor: Wolfgang Schmidt, Hamburg-Othmarschen, Germany

[73] Assignee: U.S. Philips Corporation, New York, N.Y.

[22] Filed: Nov. 30, 1970

[21] Appl. No.: 93,596

[30] Foreign Application Priority Data

Dec. 2, 1969 Germany ......................P 19 60 421.8

[52] U.S. Cl. ................................315/5.39, 313/33, 313/46, 313/45

[51] Int. Cl. ..........................................................H01j 25/10

[58] Field of Search .................315/5.39; 313/33, 39, 40, 45, 313/46

[56] References Cited

UNITED STATES PATENTS

| | | | |
|---|---|---|---|
| 3,103,609 | 9/1963 | Zitelli | 313/46 X |
| 3,391,299 | 7/1968 | Bodmer et al | 315/3.6 X |
| 3,398,315 | 8/1968 | Washburn | 313/46 X |
| 3,394,282 | 7/1968 | Schmidt | 313/45 X |

*Primary Examiner*—Herman Karl Saalbach
*Assistant Examiner*—Saxfield Chatmon, Jr.
*Attorney*—Frank R. Trifari

[57] ABSTRACT

A heat trap for an air-cooled klystron having components stacked to form the drift tube and individual resonators. The heat trap is arranged between the components and comprises a thin wall pipe forming part of the drift tube and having cooling fins attached to the exterior surfaces thereof. The cooling fins apertures for members supporting the stacked components.

4 Claims, 3 Drawing Figures

Figure 1:
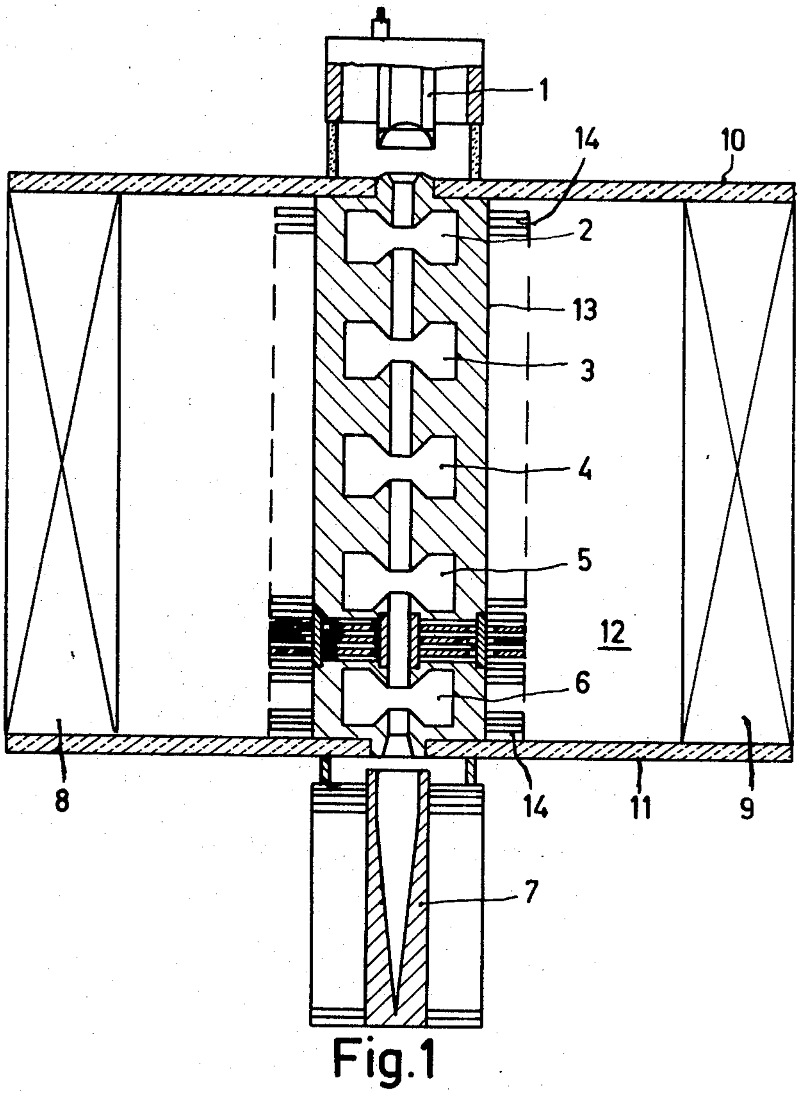

INVENTOR.
WOLFGANG SCHMIDT
BY
AGENT

INVENTOR.

WOLFGANG SCHMIDT

BY

AGENT

HEAT TRAP FOR AN AIR-COOLED VHF POWER KLYSTRON

The invention relates to a heat trap for an air-cooled VHF power klystron which consists of several components which can be stacked one on the other and form the individual resonators, said components comprising cooling ribs on their outer surfaces.

UHF power klystrons having several cavities or resonators are known the individual resonator sections of which are constructed from numerous parts including the so-called drift spaces which, for better cooling, comprise radially extending cooling ribs or cooling plates, for example, of copper (DBGM1, 927,301; U.S. Pat. specification No. 2,475,652.). The wall thicknesses of the drift spaces are usually adapted considerably or are adapted entirely to the requirements in the resonant cavity (FIG. 1 of the U.S. Pat. No. 2,475,652, left-hand side). They are by no means weakened so that accumulation of heat results for, in order to avoid this, further measures must be taken simultaneously.

Heat traps as such are also known as shown, for example, in FIG. 6 of the British Pat. specification No. 646,362 component 29). Each heat trap must perform the same function, but for its construction and operation it requires careful considerations which in most of the cases necessitate a reconstruction and adaptation of all the components in the proximity of the said heat trap in order that the required effect is not adversely influenced by new disturbing effects.

In the UHF power klystron such constructions were still possible with comparatively small costs owing to the comparatively low frequencies. In the SHF power klystron, so in the GHz range, the cost increases owing to the high requirement imposed upon the accuracy of the components. For example, the SHF power klystron is known in a compact construction of parts which can be stacked one on the other and are accurately adapted to each other and comprising cooling ribs on the conical surface and water cooling. No noteworthy difficulties occurred any longer.

The requirement of maintenance freedom requires a switch to air-cooling which resulted in frequency shifts. The problem underlying the invention was to avoid these and to provide a solution the realization of which enables the use of available components, or the use of available components with the smallest possible change.

According to the invention, the solution to the heat trap of the type mentioned in the preamble consists in that the heat trap consists of a pipe which, compared with the adjacent parts, is thin-walled and comprises cooling ribs which, distributed on their circumference, comprise apertures in the proximity of their outer surfaces for receiving supports.

It has furthermore been found that the amplifier resonator sections have a comparatively narrow band width, whereas on the other hand the output resonator section has a wide band so that it is often sufficient for the heat trap according to the invention to be arranged only between the last amplifier resonator section and the output resonator section.

In order to intensify the desirable effect, the thin-walled pipe and/or the support may consist of a material which poorly conduct heat.

Figure 2:
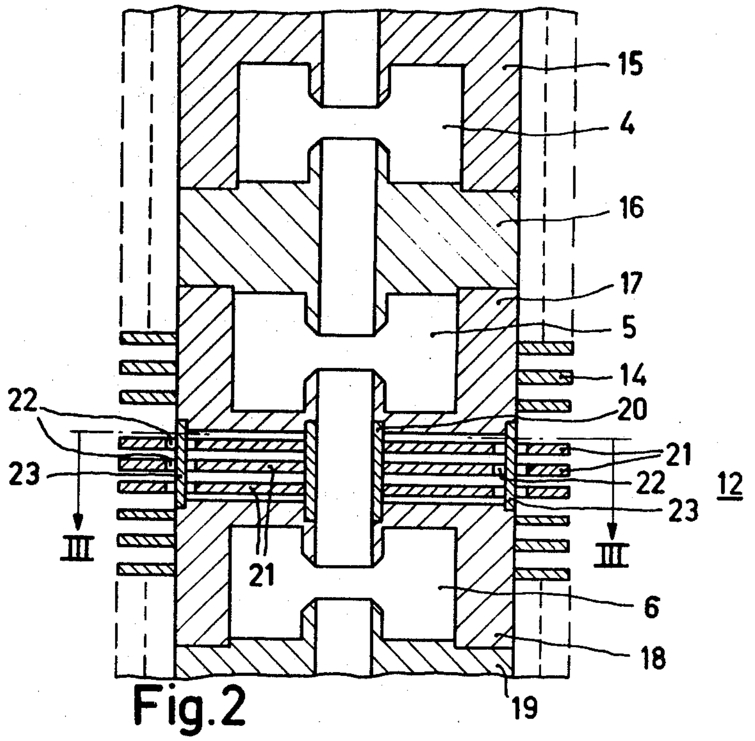
Figure 3:
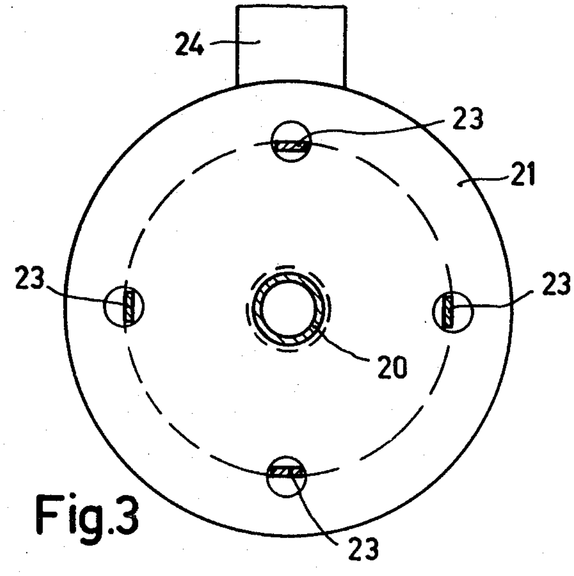

In order that the invention may be readily carried into effect, one embodiment thereof will now be described in greater detail, by way of example, with reference to the accompanying drawing, in which FIG. 1 is a cross-sectional view of an air-cooled SHF power klystron, FIG. 2 shows a detail of the arrangement shown in FIG. 1, FIG. 3 is a cross-sectional view taken on the line III—III of FIG. 2.

Reference numeral 1 in FIG. 1 denotes the diagrammatically shown electron gun system of a VHF power klystron. Below said electron gun system 1, the resonator sections 2, 3, 4, 5 and 6 and below these the collector 7 are arranged.

For focusing the electron beam, the SHF-power klystron comprises a magnet system, in this example constructed with permanent magnets, consisting of permanent magnet columns 8 and 9 as well as poleshoes 10 and 11. The resonator sections 2, 3, 4 and 5 are amplifiers constructed so as to be narrow banded, whereas the resonator section 6, the output resonator section, is constructed so as to be wide-banded.

The heat trap 12 according to the invention is arranged between the last amplifier resonator section 5 and the output resonator section 6.

All the resonator sections comprise cooling ribs 14 on their outer surfaces 13.

FIG. 2 shows from the top to the bottom the amplifier resonator section 4, constituted by a rotary part 15 and by a second rotary part 16 which, like the rotary parts 17, 18 and 19, can be stacked one on the other. The last amplifier resonator section 5 is separated from the output resonator section 6 by the heat trap 12 according to the invention.

This heat trap 12 according to the invention consists of a thin-walled pipe 20 surrounding the resonant cavity. Cooling ribs 21 are arranged on the outer surface of the said pipe 20. In the proximity of their outer surfaces, the cooling ribs 21 comprise apertures 22, through which supports 23 project. The supports 23 connect the rotary parts 17 and 18 together mechanically. The cooling ribs 21 project outwards with their outer surfaces over such a distance that they are in alignment with the cooling ribs 14. The thin-walled tube 20 as well as the supports 23 may consist of a material which poorly conducts heat, for example, an iron-nickel-chromium alloy (stainless steel) or an iron-nickel-cobalt alloy.

FIG. 3 shows, by way of example, a cross-section for the supports 23, namely rectangular. The output coupling member is denoted by 24.

What is claimed is:

1. An air-cooled klystron comprising a plurality of components stacked one upon the other to form a drift tube and individual resonators, said components comprising cooling fins on their outer surfaces, and a heat trap comprising a thin wall pipe forming a part of said drift tube between said stacked components, cooling fins attached to the outer surface of said thin-walled pipe and having apertures near the radial extremities thereof, and members passing through said apertures for supporting said stacked components.

2. An air-cooled klystron as claimed in claim 1 wherein said heat trap is positioned around the part of the drift tube between the next to the last and last resonator sections.

3. An air-cooled klystron as claimed in claim 1 wherein said thin-walled pipe comprises materials that are insulators of heat.

4. An air-cooled klystron as claimed in claim 1 wherein said support members comprise materials that are insulators of heat.

* * * * *